US012064883B2

(12) United States Patent
Hardy et al.

(10) Patent No.: US 12,064,883 B2
(45) Date of Patent: Aug. 20, 2024

(54) METHODS FOR SELECTING A PATH OF A MULTI-COMPONENT END EFFECTOR ALONG A SURFACE, ROBOTS THAT PERFORM THE METHODS, AND STORAGE MEDIA THAT DIRECTS ROBOTS TO PERFORM THE METHODS

(71) Applicant: The Boeing Company, Chicago, IL (US)

(72) Inventors: Willaredt Hardy, San Francisco, CA (US); Anthony W. Baker, Gilbertsville, PA (US)

(73) Assignee: The Boeing Company, Arlington, VA (US)

( * ) Notice: Subject to any disclaimer, the term of this patent is extended or adjusted under 35 U.S.C. 154(b) by 211 days.

(21) Appl. No.: 17/873,649

(22) Filed: Jul. 26, 2022

(65) Prior Publication Data

US 2024/0033926 A1 Feb. 1, 2024

(51) Int. Cl.
*B25J 9/00* (2006.01)
*B25J 9/16* (2006.01)
*B25J 15/00* (2006.01)

(52) U.S. Cl.
CPC ......... *B25J 9/1684* (2013.01); *B25J 15/0052* (2013.01); *G05B 2219/39001* (2013.01)

(58) Field of Classification Search
CPC .... B25J 9/1684; B25J 15/0052; B25J 9/1664; G05B 2219/39001; G05B 2219/40074; B41J 3/4073
See application file for complete search history.

(56) References Cited

U.S. PATENT DOCUMENTS

2016/0144384 A1 5/2016 Pitz et al.
2021/0252707 A1 8/2021 Wang et al.
(Continued)

FOREIGN PATENT DOCUMENTS

CN 113245724 A 8/2021
JP 2021160059 A 10/2021

OTHER PUBLICATIONS

English language machine-generated translation of Chinese Patent Application Publication No. CN113245724A, Aug. 13, 2021.
(Continued)

*Primary Examiner* — Ian Jen
(74) *Attorney, Agent, or Firm* — Kolitch Romano Dascenzo Gates LLC

(57) ABSTRACT

Methods for selecting a path of a multi-component end effector along a surface, robots that perform the methods, and storage media that directs robots to perform the methods. The multi-component end effector is attached to a robot, which is configured to move the multi-component end effector along the surface on a continuous tool centerpoint path (TCP). The multi-component end effector includes a plurality of end effector elements configured to move relative to one another. The method includes providing a discretized TCP that includes a plurality of spaced-apart waypoints along the continuous TCP. The method also includes determining a plurality of distance heuristics. The method further includes updating the plurality of distance heuristics to define a plurality of updated distance heuristics. The method also includes selecting the path of the multi-component end effector along the surface based upon the plurality of updated distance heuristics.

20 Claims, 6 Drawing Sheets

(56) References Cited

U.S. PATENT DOCUMENTS

2022/0134574 A1 5/2022 Provenaz et al.
2022/0193903 A1* 6/2022 Ingram .................. B25J 9/1664

OTHER PUBLICATIONS

English language machine-generated translation of Japanese Patent Application Publication No. JP2021160059A, Oct. 11, 2021.
Extended European Search Report in related EP App. No. 23175871, issued Dec. 8, 2023.

* cited by examiner

METHODS FOR SELECTING A PATH OF A MULTI-COMPONENT END EFFECTOR ALONG A SURFACE, ROBOTS THAT PERFORM THE METHODS, AND STORAGE MEDIA THAT DIRECTS ROBOTS TO PERFORM THE METHODS

FIELD

The present disclosure relates generally to methods for selecting a path of a multi-component end effector along a surface, to robots that perform the methods, and to storage media that directs robots to perform the methods.

BACKGROUND

Robotic systems may utilize end effectors to perform tasks on and/or near a surface. For some such robotic systems, it may be desirable to perform tasks in close proximity to the surface while the end effectors move relative to the surface and without physically contacting the surface. Motion of the end effectors relative to the surface may be both physically and kinematically constrained. Physical constrains may be a result of directions of motion and/or ranges of motion that may be accessible to a given robotic system. Kinematic constraints may arise from accelerations and/or velocities that may be accessible to the robotic systems and/or to the end effectors. Both physical and kinematic constraints must be considered when programming robotic systems to perform tasks on and/or near surfaces. Conventional solutions to programming robotic systems to perform tasks on and/or near a surface are computationally intensive and may not be feasible when large and/or complex end effectors are programmed to move near large and/or curvilinear surfaces. Thus, there exists a need for improved methods for selecting a path of a multi-component end effector along a surface, for robots that perform the methods, and for storage media that directs robots to perform the methods.

SUMMARY

Methods for selecting a path of a multi-component end effector along a surface, robots that perform the methods, and storage media that directs robots to perform the methods are disclosed herein. The multi-component end effector is attached to a robot, which is configured to move the multi-component end effector along the surface on a continuous tool centerpoint path (TCP). The multi-component end effector includes a plurality of end effector elements configured to move, relative to one another, within a command space of the multi-component end effector. The method includes providing a discretized TCP that includes a plurality of spaced-apart waypoints along the continuous TCP. At each waypoint, the method also includes determining a plurality of distance heuristics for the plurality of end effector elements and within the command space of the end effector. Each distance heuristic quantifies a fraction of the plurality of end effector elements that is within a target distance range of the surface for a corresponding relative orientation of the plurality of end effector elements. The target distance range is defined between a minimum distance and a maximum distance. Subsequent to the determining the plurality of distance heuristics, the method further includes updating the plurality of distance heuristics to define a plurality of updated distance heuristics. The updating includes, for each corresponding relative orientation at a first waypoint, determining a subset of corresponding relative orientations at an immediately subsequent waypoint that is accessible to the multi-component end effector. The updating also includes modifying the plurality of distance heuristics for each corresponding relative orientation at the first waypoint based upon corresponding distance heuristics for the subset of corresponding relative orientations. The updating further includes sequentially repeating the determining the subset of corresponding relative orientations and the modifying the plurality of distance heuristics for each waypoint. The method also includes selecting the path of the multi-component end effector along the surface based upon the plurality of updated distance heuristics.

DESCRIPTION

Figure 1:
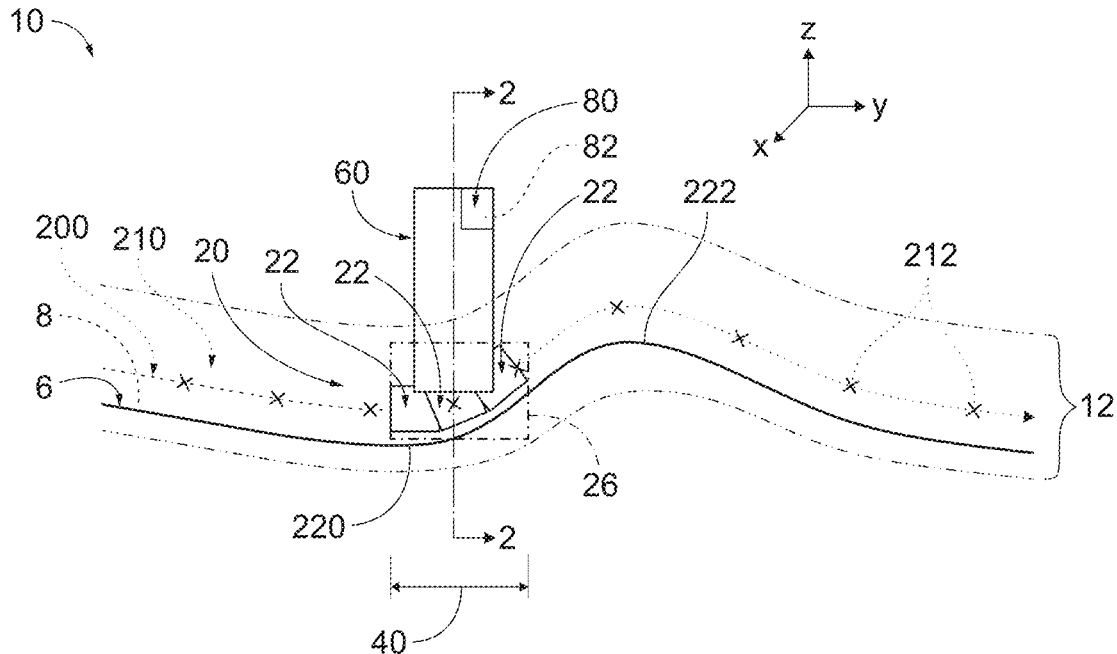
FIG. 1 is a schematic side view illustrating examples of a system, according to the present disclosure, for performing an operation near a surface.

FIGS. 1-9 provide illustrative, non-exclusive examples of methods 100 of selecting a path of a multi-component end effector and/or of systems 10, according to the present disclosure. Elements that serve a similar, or at least substantially similar, purpose are labeled with like numbers in each of FIGS. 1-9, and these elements may not be discussed in detail herein with reference to each of FIGS. 1-9. Similarly, all elements may not be labeled in each of FIGS. 1-9, but reference numerals associated therewith may be utilized herein for consistency. Elements, components, and/or features that are discussed herein with reference to one or more of FIGS. 1-9 may be included in and/or utilized with any of FIGS. 1-9 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

Figure 2:
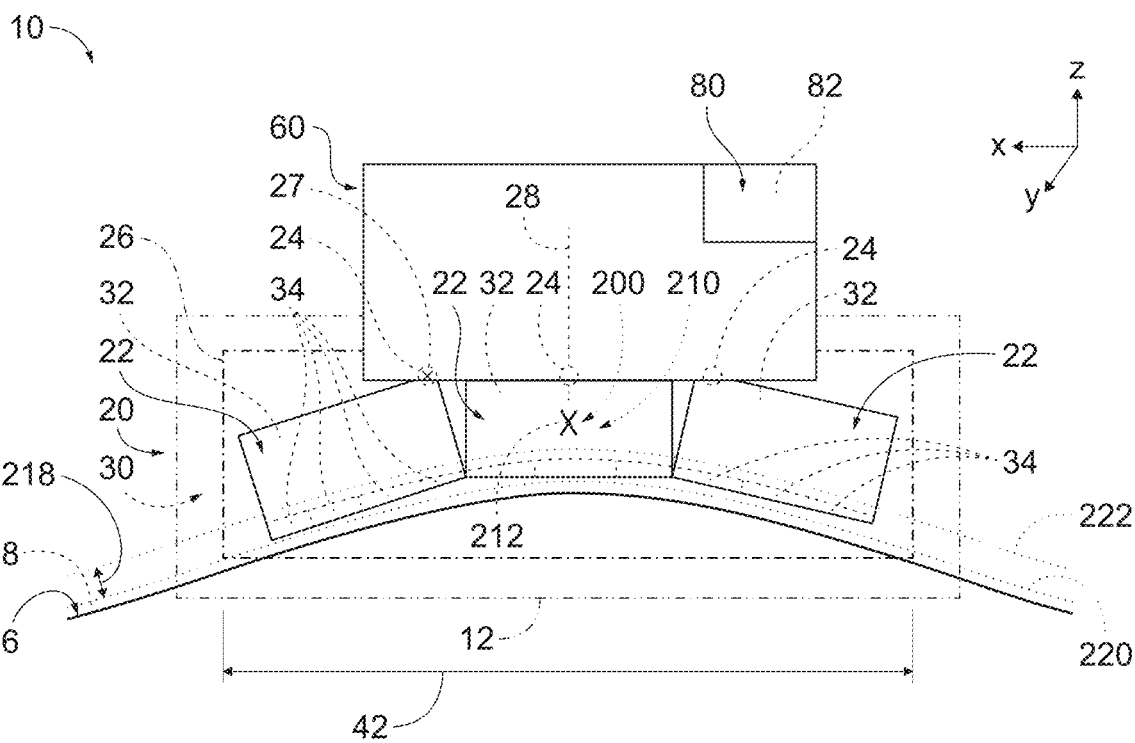
FIG. 2 is a schematic cross-sectional view of the system of FIG. 1 taken along line 2-2 of FIG. 1.

FIG. 1 is a schematic side view illustrating examples of a system 10, according to the present disclosure, for performing an operation near a surface 6; and FIG. 2 is a schematic cross-sectional view of system 10 of FIG. 1 taken along line 2-2 of FIG. 1. As illustrated in FIGS. 1-2, system 10 includes a multi-component end effector 20, a robot 60, and a controller 80. Multi-component end effector 20, which also may be referred to herein as end effector 20, includes a plurality of end effector elements 22 configured to move relative to one another and/or within a command space 26 of multi-component end effector 20. End effector 20 is operatively attached to robot 60, and robot 60 is configured to move end effector 20 along and/or relative to surface 6, such as within a work envelope 12 of system 10 that extends along a continuous tool centerpoint path (TCP) 200. Continuous TCP 200 may define a path for a predefined region of multi-component end effector 20, such as a center of mass and/or a centroid of multi-component end effector 20, as multi-component end effector 20 moves along surface 6. Stated differently, and as discussed in more detail herein, multi-component end effector 20 may be relatively large, and continuous TCP 200 may define a desired location, or trajectory, for the predefined region of multi-component end effector 20 as multi-component end effector 20 moves relative to surface 6.

Controller 80 is programmed to control the operation of at least one other component of system 10. This may include directing the at least one other component of system 10 to perform any suitable step and/or steps of methods 100, which are discussed in more detail herein.

As used herein, the phrase "task space" refers to a coordinate system within which system 10 operates and/or is positioned. As an example, and as illustrated in FIGS. 1-2, a task space for system 10 may be defined by and/or within an X-Y-Z Cartesian coordinate system; however, other coordinate systems also may be utilized.

As used herein, the phrase "command space," "command space 26," and/or "command space 26 of multi-component end effector 20" refers to a space, or a volume, within which end effector elements 22 may move, or may be configured to move, relative to one another. Stated differently, command space 26 defines and/or bounds a volume within which end effector elements 22 may be configured to move, to articulate, to rotate, and/or to translate relative to one another and/or relative to an attachment point between end effector elements 22 and robot 60. With this in mind, and as illustrated in FIGS. 1-2, command space 26 may be a subset of the task space for system 10 that is centered on and/or that surrounds end effector 20.

As used herein, the phrase "work envelope," "work envelope 12," and/or "work envelope 12 for system 10" may refer to an overall space, or a volume, within which end effector 20 is configured to move. In general, work envelope 12 is larger than and includes command space 26, as work envelope 12 encompasses the combination of motion that is accessible to end effector 20 within command space 26 as well as motion that is accessible to robot 60, such as to move end effector 20 along continuous TCP 200. With this in mind, and as illustrated in FIG. 1, work envelope 12 may be a subset of the task space for system 10 that extends along continuous TCP 200. Work envelope 12 also may be referred to herein as and/or may be "a component work envelope 12," "a work envelope 12 for each end effector element 22 of multi-component end effector 20," and/or "a component work envelope 12 for each end effector element 22 of multi-component end effector 20."

System 10 and/or end effector 20 thereof may be configured to perform at least one operation on and/or near surface 6. As examples, system 10 and/or end effector 20 may be configured to image surface 6 and/or to scan surface 6. As another example, system 10 and/or end effector 20 may be configured to print on, to print text on, and/or to print a graphic on surface 6. In some such examples, multi-component end effector 20 may include and/or be a multi-component inkjet print engine 30; and/or end effector elements 22 may include and/or be individually moveable inkjet print-head arrays 32, each of which may include a plurality of inkjet print-heads 34, as illustrated in FIG. 2.

During operation of system 10, and as discussed in more detail herein with reference to methods 100, controller 80 may control and/or regulate motion of robot 60 and attached end effector 20 along surface 6. This may include control and/or regulation of the motion along continuous TCP 200. As illustrated in FIGS. 1-2, surface 6 may include and/or be a non-planar and/or a curvilinear surface 6, an example of which may include an aerodynamic surface 8 of an aircraft. In addition, surface 6 may be quite large in size. As examples, a surface area of surface 6 may be at least 10 square meters, at least 20 square meters, at least 50 square meters, at least 100 square meters, at least 250 square meters, or at least 500 square meters.

In some examples, system 10 and/or end effector 20 thereof only may perform, or only may be directed to perform, the operation on surface 6 when end effector elements 22, or suitable regions and/or sub-components of end effector elements 22, are within a target distance range 218 of surface 6, as illustrated in FIG. 2. Target distance range 218 may be bounded and/or defined between a minimum distance 220 and a maximum distance 222. As an example, and when end effector 20 includes multi-component inkjet print engine 30, inkjet print-heads 34 only may be permitted to print on surface 6, or only may produce an acceptable print quality on surface 6, when inkjet print-heads 34 are within target distance range 218 of surface 6.

With the above in mind, and as discussed, end effector elements 22 may be configured to move relative to one another and/or within command space 26. Such a configuration may permit and/or facilitate matching of the relative orientation of end effector elements 22 to a shape of surface 6, as illustrated in FIGS. 1-2. This may increase, improve, and/or optimize a fraction of end effector elements 22, a fraction of a surface of end effector elements 22 that faces toward surface 6, and/or a fraction of a component of end effector elements 22, such as inkjet print-heads 34, that is within target distance range 218 of surface 6 at any given location along continuous TCP 200. Stated differently, the ability of end effector elements 22 to move relative to one another and/or to at least partially match the shape of surface 6 may improve an ability for system 10 and/or end effector 20 thereof to perform the operation on surface 6 and/or may permit end effector 20 to adapt to changes in the shape of surface 6 at different locations along continuous TCP 200.

It is within the scope of the present disclosure that end effector elements 22 may move relative to one another in any suitable manner and/or by any suitable magnitude. As an example, end effector 20 may include a plurality of actuators 24, as illustrated in FIG. 2. Actuators 24 may be configured to permit and/or to facilitate relative motion, or constrained relative motion, among end effector elements 22. This may include relative translational motion, such as along a translational axis 28 of actuators 24 and/or relative rotational motion, such as about a rotational axis 27 of actuators 24. As another example, end effector 20 may be configured to permit and/or facilitate a maximum range-of-motion, such as for end effector elements 22 and/or via actuation of actuators 24. This maximum range-of-motion, which may be bounded by command space 26, may be measured in any suitable direction, such as in a direction that is parallel and/or perpendicular to continuous TCP 200. Examples of the maximum range-of-motion include at least 0.1 meters (m), at least 0.15 m, at least 0.2 m, at least 0.25 m, at least 0.3 m, at least 0.35 m, at least 0.4 m, at most 1 m, at most 0.9 m, at most 0.8 m, at most 0.7 m, at most 0.6 m, at most 0.5 m, at most 0.4 m, and/or at most 0.3 m.

End effector 20 may include any suitable structure that includes end effector elements 22 and/or that is configured to permit and/or facilitate relative motion among end effector elements 22 and/or within command space 26. Examples of end effector 20 are disclosed herein. It is within the scope of the present disclosure that end effector 20 may include any suitable number of end effector elements 22. As examples, end effector 20 may include at least 2, at least 4, at least 6, at least 8, at least 10, at least 12, at least 14, at least 16, at most 30, at most 25, at most 20, or at most 15 end effector elements 22.

In addition, end effector elements 22 may be arranged, within end effector 20, in any suitable manner. As an example, end effector elements 22 may form and/or define an array, a regular array, an irregular array, and/or a two-dimensional array of end effector elements 22.

Robot 60 may include any suitable structure that may be adapted, configured, designed, and/or constructed to move end effector 20 along surface 6 and/or along continuous TCP 200. As examples, robot 60 may include one or more robotic arms, one or more translational elements, and/or one or more rotational elements. In some examples, robot 60 may include at least one translational element that is configured to move end effector 20 along a length of surface 6 and/or along a length of continuous TCP 200. In some examples, robot 60 may include at least one translational and/or rotational element that is configured to move end effector 20 perpendicular to, toward, and/or away from surface 6, such as to permit and/or facilitate motion of end effector 20 along a curvilinear continuous TCP 200 that follows, mimics, mirrors, and/or is based upon a shape of surface 6.

Controller 80 may include and/or be any suitable structure, device, and/or devices that may be adapted, configured, designed, constructed, and/or programmed to perform the functions discussed herein. This may include controlling the operation of the at least one other component of system 10, such as via and/or utilizing methods 100, which are discussed in more detail herein. As examples, controller 80 may include one or more of an electronic controller, a dedicated controller, a special-purpose controller, a personal computer, a special-purpose computer, a display device, a touch-screen display, a logic device, a memory device, and/or a memory device having computer-readable storage media 82.

Computer-readable storage media 82, when present, also may be referred to herein as non-transitory computer-readable storage media. This non-transitory computer-readable storage media may include, define, house, and/or store computer-executable instructions, programs, and/or code; and these computer-executable instructions may direct system 10 and/or controller 80 thereof to perform any suitable portion, or subset, of methods 100. Examples of such non-transitory computer-readable storage media include CD-ROMs, disks, hard drives, flash memory, etc. As used herein, storage, or memory, devices and/or media having computer-executable instructions, as well as computer-implemented methods and other methods according to the present disclosure, are considered to be within the scope of subject matter deemed patentable in accordance with Section 101 of Title 35 of the United States Code.

It is within the scope of the present disclosure that system 10 may be configured to control the motion of end effector 20 such that end effector 20 is close, or relatively close, to surface 6. As an example, and with reference to FIG. 2, minimum distance 220 may be 0.5 millimeters (mm), 1 mm, 1.5 mm, 2 mm, 2.5 mm, 3 mm, 4 mm, 6 mm, 8 mm, or 10 mm. Additionally or alternatively, maximum distance 222 may be 50 mm, 40 mm, 30 mm, 25 mm, 20 mm, 18 mm, 16 mm, 14 mm, 12 mm, 10 mm, 9 mm, 8 mm, 7 mm 6 mm, or 5 mm. Such a configuration may permit end effector 20 to perform operations that require a close proximity between end effector 20 and surface 6, such as printing, or inkjet printing, on surface 6.

System 10 may be configured to move end effector 20 along continuous TCP 200 at any suitable speed. In some examples, the speed of end effector 20 along continuous TCP 200 may be fixed and/or constant. Such a configuration may permit and/or facilitate improved and/or predictable performance of the operation by end effector 20 and on surface 6. As a specific example, the fixed and/or constant speed may permit and/or facilitate printing on surface 6 by end effector 20. Examples of the fixed and/or constant speed of end effector 20 along continuous TCP 200 include at least 0.05 meters/second (m/s), at least 0.1 m/s, at least 0.15 m/s, at least 0.2 m/s, at least 0.25 m/s, at least 0.3 m/s, at least 0.4 m/s, at least 0.5 m/s, at most 1 m/s, at most 0.9 m/s, at most 0.8 m/s, at most 0.7 m/s, at most 0.6 m/s, at most 0.5 m/s, at most 0.4 m/s, at most 0.35 m/s, at most 0.3 m/s, at most 0.25 m/s, at most 0.2 m/s, and/or at most 0.15 m/s.

In some examples, multi-component end effector 20 may be configured to move end effector elements 22 relative to one another at less than, or up to, a maximum component speed, which may be defined and/or measured relative to a surface normal direction of surface 6. Examples of the maximum component speed include speeds of at least 0.2 m/s, at least 0.3 m/s, at least 0.4 m/s, at least 0.5 m/s, at least 0.6 m/s, at least 0.7 m/s, at least 0.8 m/s, at least 0.9 m/s, at least 1 m/s, at most 2 m/s, at most 1.9 m/s, at most 1.8 m/s, at most 1.7 m/s, at most 1.6 m/s, at most 1.5 m/s, at most 1.4 m/s, at most 1.3 m/s, at most 1.2 m/s, at most 1.1 m/s, and/or at most 1.0 m/s. The maximum component speed may be an indication of how quickly system 10 may adjust end effector 20 to changes in the shape of surface 6.

As discussed, surface 6 may be relatively large in size and/or may have a relatively large surface area, examples of which are disclosed herein. With this in mind, end effector 20 also may be relatively large, at least with respect to minimum distance 220 of FIG. 2. As an example, and as illustrated in FIG. 1, end effector 20 may have an end effector length 40, or a maximum end effector length 40, of at least 1.25 meters (m), at least 1.5 m, at least 2 m, at least 2.5 m, at least 3 m, at most 4 m, at most 3.5 m, at most 3 m, at most 2.5 m, and/or at most 2 m. As another example, end effector 20 may have an end effector width 42, or a maximum end effector width 42, as illustrated in FIG. 2, of at least 1.25 m, at least 1.5 m, at least 2 m, at least 2.5 m, at least 3 m, at most 4 m, at most 3.5 m, at most 3 m, at most 2.5 m, and/or at most 2 m. A magnitude of end effector length 40 and/or of end effector width 42 may be selected based upon a variety of factors including the size or surface area of surface 6 and/or the ability of system 10 to reliably move a given size of end effector 20 along surface 6. In general, larger end effector lengths 40 and/or larger end effector widths 42 may permit and/or facilitate faster performance of the operation on surface 6. However, larger end effector lengths 40 and/or larger end effector widths 42 may dictate that end effector 20 includes proportionately more end effector elements 22, which may make it more challenging to control the relative orientation of end effector elements 22 as end effector 20 moves along surface 6. However, methods 100, which are discussed in more detail herein, address this challenge in a novel manner that is significantly less computationally intensive when compared to conventional solutions for programming robotic systems to perform tasks on and/or near surfaces.

Figure 3:
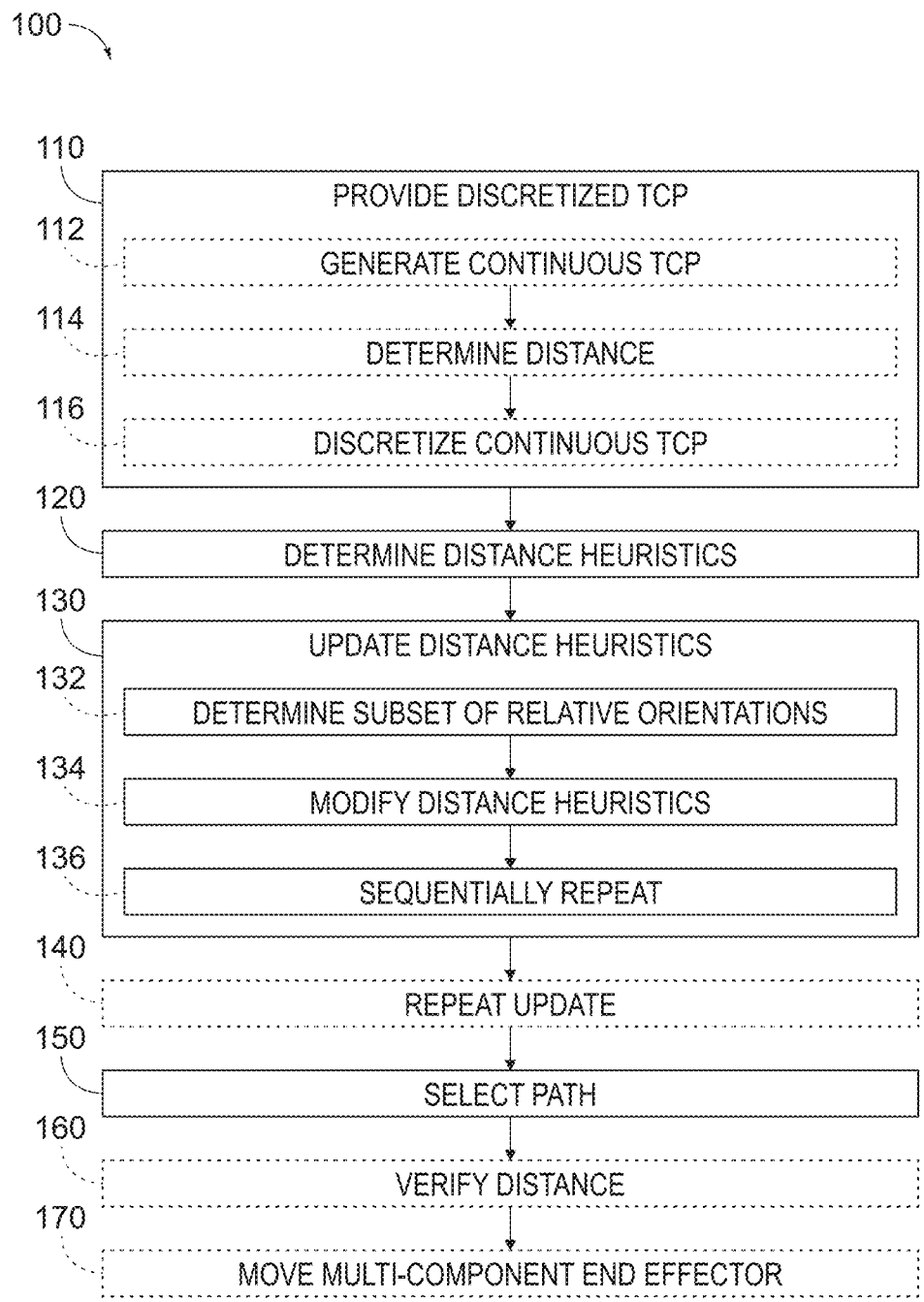
FIG. 3 is a flowchart depicting examples of methods for selecting a path of a multi-component end effector along a surface, according to the present disclosure.

FIG. 3 is a flowchart depicting examples of methods 100 for selecting a path of a multi-component end effector along a surface, according to the present disclosure. The multi-component end effector is attached to a robot that is configured to move the multi-component end effector along the surface on a continuous tool centerpoint path (TCP). The movement may be at a fixed surface speed. The multi-component end effector includes a plurality of end effector elements that are configured to move relative to one another and within a command space of the multi-component end effector. This motion may be less then, or bounded by, a maximum component speed of the multi-component end effector and/or of individual end effector elements of the multi-component end effector. Examples of the multi-component end effector are disclosed herein with reference to multi-component end effector 20. Examples of the plurality of end effector elements are disclosed herein with reference to end effector elements 22. Examples of the robot are disclosed herein with reference to robot 60. Examples of the continuous TCP are disclosed herein with reference to continuous TCP 200. Example of the fixed surface speed and the maximum component speed are disclosed herein. Examples of the command space are disclosed herein with reference to command space 26.

Methods 100 include providing a discretized TCP at 110, determining distance heuristics at 120, and updating the distance heuristics at 130. Methods 100 also may include repeating at 140 the updating at 130 and include selecting a path at 150. Methods 100 further may include verifying a distance at 160 and/or moving a multi-component end effector at 170.

Providing the discretized TCP at 110 may include providing any suitable discretized TCP. The discretized TCP includes a plurality of spaced-apart waypoints along the continuous TCP. Examples of the discretized TCP are illustrated in FIGS. 1-2 and indicated at 210. Examples of the plurality of spaced-apart waypoints are illustrated in FIGS. 1-2 and indicated at 212.

Within the discretized TCP, and as discussed in more detail herein, a distance between each waypoint and an adjacent waypoint may be based, at least in part, on a maximum height of the surface along the continuous TCP, a minimum height of the surface along the continuous TCP, the maximum component speed of the plurality of end effector elements, and the fixed surface speed of the multi-component end effector along the continuous TCP. Stated differently, the distance between each waypoint and an adjacent waypoint may be based upon and/or a function of an ability of the system, the robot, and/or the multi-component end effector to respond to variations in surface height given the overall kinematic constraints for motion of the multi-component end effector, both along the continuous TCP and perpendicular to the continuous TCP. An example of the minimum height is illustrated in FIG. 1 and indicated at 220. An example of the maximum height is illustrated in FIG. 1 and indicated at 222.

Figure 4:
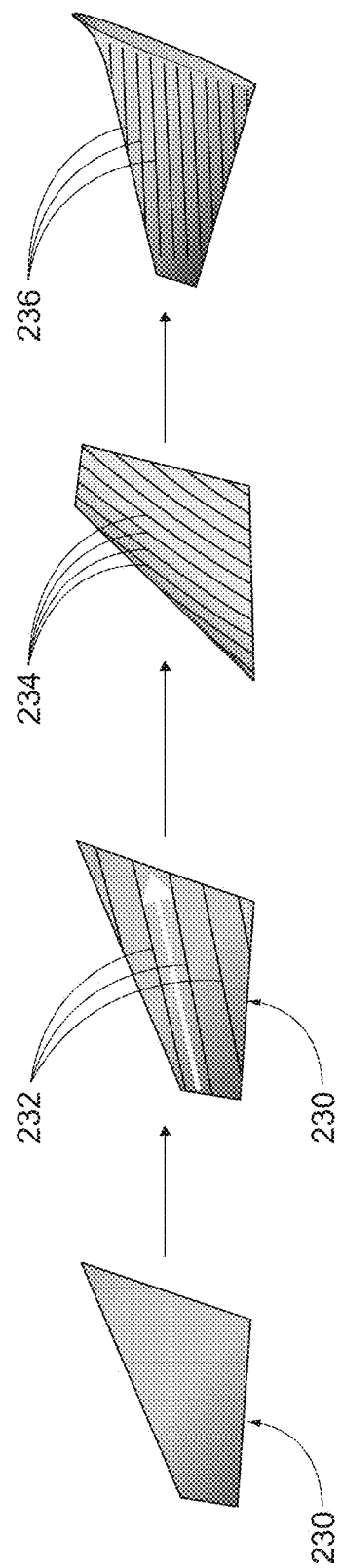
FIG. 4 is an illustration of an example of generation of a continuous tool centerpoint path that may be performed during the methods of FIG. 3.

The providing at 110 may be performed in any suitable manner. As an example, the providing at 110 may include accessing the discretized TCP, such as from a database of discretized TCPs that previously have been determined for given and/or specific surfaces. As another example, and as illustrated in dashed lines in FIG. 3, the providing at 110 may include generating a continuous TCP at 112, determining a distance at 114, and discretizing the continuous TCP at 116. FIG. 4 is an illustration of an example of generation of a continuous tool centerpoint path that may be performed during the providing at 110 and is discussed in more detail herein.

Generating the continuous TCP at 112 may include generating, defining, and/or establishing the continuous TCP in any suitable manner. As an example, the generating at 112 may include providing a representation of the surface. This may include providing any suitable model, mathematical description, and/or geometric description of the surface, such as a computer-aided design drawing of the surface and/or a 3-D scan of the surface. With this in mind, the generating at 112 may include providing the model of the surface, providing the mathematical description of the surface, providing the geometric description of the surface, and/or 3-D scanning the surface. An example of a representation of the surface is illustrated in FIG. 4 and indicated at 230.

In some examples, the generating at 112 may include selecting an initial trajectory for the multi-component end effector along the representation of the surface. The initial trajectory may include a plurality of individual paths along the representation of the surface, and a spacing between adjacent paths may be selected based, at least in part, on one or more geometric constraints of the system, such as a size of the multi-component end effector. Stated differently, the initial trajectory including the plurality of individual paths, may be selected such that, upon completing the plurality of individual paths, the multi-component end effector moves across and/or moves within a target distance range of an entirety of the surface and/or an entirety of a desired region of the surface. Examples of the target distance range are disclosed herein. This is illustrated in FIG. 4, with the plurality of individual paths along representation 230 of the surface being indicated at 232, and the arrow illustrating an example of the direction that the multi-component end effector moves when traversing the plurality of individual paths 232.

In some such examples, the generating at 112 also may include modifying, or subsequently modifying, the initial trajectory to produce and/or to generate the continuous TCP. The modifying may include improving a correspondence between a shape of the initial trajectory and the representation of the surface. As an example, the modifying may include via curve-fitting the initial trajectory to the representation of the surface. As another example, the modifying may include modifying based, at least in part, on local surface normal and/or local gradients of the representation of the surface. In some examples, the modifying may include modifying such that the work envelope of the multi-component end effector overlaps with the representation of the surface along the continuous TCP, and/or such that the work envelope of the multi-component end effector is within the target distance range of the surface along the continuous TCP. The modifying is illustrated in FIG. 4, where individual paths that have been modified via curve-fitting are indicated at 234, and individual paths that have been modified based upon local surface normal and/or gradients of the representation of the surface are indicated at 236.

Determining the distance at 114 may include determining, establishing, and/or calculating a distance between adjacent waypoints of the plurality of spaced-apart waypoints. This may include determining, along the continuous TCP, a maximum distance between the continuous TCP and the surface, a minimum distance between the continuous TCP and the surface, and/or a distance difference between the maximum distance and the minimum distance. The distance difference may be indicative of a maximum amount of motion that may be needed, from the multi-component end effector and/or within the work envelope of the multi-component end effector, as the robot moves the multi-component end effector along the continuous TCP.

With this in mind, the determining at 114 then may include determining, establishing, and/or calculating the distance between adjacent waypoints based, at least in part, on the fixed surface speed of the multi-component end effector, the maximum component speed relative to the surface normal of the surface, and the distance difference. Stated differently, the determining at 114 may take into account the kinematic constraints of the system, of the robot, and/or of the multi-component end effector, and the distance between adjacent waypoints may be selected such that any motion of the multi-component end effector relative to the continuous TCP, such as may be needed to avoid a collision between the multi-component end effector and the surface and/or to maintain the plurality of end effector elements of the multi-component end effector within the target distance range, is within the kinematic constraints of the system.

Discretizing the continuous TCP at 116 may include discretizing the continuous TCP into the plurality of spaced-apart waypoints, which are spaced-apart by the distance between adjacent waypoints as established during the determining at 114. Stated differently, the discretizing at 116 may include superimposing the plurality of spaced-apart waypoints on the continuous TCP, with the distance between adjacent waypoints being dictated by the determining at 114.

In some examples, the providing at 110 and/or the discretizing at 116 further may include interpolating between adjacent waypoints to define the discretized TCP. Stated differently, the plurality of spaced-apart waypoints may define a plurality of locations at which the multi-component end effector, or a predefined region of the multi-component end effector, is positioned at various times as the multi-component end effector moves along the discretized TCP. With this in mind, the interpolating may include providing a path for the multi-component end effector, or for the predefined region of the multi-component end effector, to traverse between adjacent waypoints. The interpolating may be performed in any suitable manner. As examples, the interpolating may include linearly or curvilinearly interpolating between adjacent waypoints.

As discussed in more detail herein, the multi-component end effector and the surface both may be relatively large in size. As also discussed in more detail herein, it may be desirable to move the multi-component end effector, relative to the surface, such that end effector elements of the multi-component end effector are within the target distance range of the surface during this motion. As further discussed, the target distance range may be relatively small when compared to the size of the multi-component end effector and/or compared to the size of the surface. As also discussed, motion of the multi-component end effector along the continuous TCP and/or motion of the end effector elements relative to the continuous TCP may be kinematically constrained. In addition, it may not be permissible for the multi-component end effector and/or for one or more end effector elements to contact the surface and/or to be less than the minimum distance from the surface. Thus, it may not be possible, feasible, and/or practical to maintain each end effector element within the target distance range at all times while the system moves the multi-component end effector along the continuous TCP.

With the above in mind, the determining the distance heuristics at 120 may be utilized to rank, to rate, to evaluate, and/or to classify potential relative orientations between the multi-component end effector and the surface and/or between the end effector elements and the surface utilizing the target distance range as a criteria. The determining at 120 may be performed in any suitable manner. As an example, and for each waypoint, the determining at 120 may include determining the plurality of distance heuristics for each end effector element and/or within the command space of the end effector. Each distance heuristic quantifies a fraction of the plurality of end effector elements that is within the target distance range of the surface for a corresponding relative orientation of the plurality of end effector elements. The plurality of distance heuristics may be determined for each relative orientation, for each possible relative orientation, and/or for each permissible relative orientation of the plurality of end effector elements within the command space of the end effector and/or for each waypoint. Stated differently, and for each waypoint, the determining at 120 may include determining a corresponding distance heuristic for each relative orientation, or for all permissible relative orientations, of the plurality of end effector elements.

In some examples, the determining at 120 may include subdividing the command space of the multi-component end effector into a plurality of corresponding relative orientations of the plurality of end effector elements. Stated differently, the multi-component end effector may be configured to move each end effector element of the plurality of end effector elements within the command space and with a corresponding spatial resolution, and the determining at 120 may include subdividing the command space such that the plurality of corresponding relative orientations of the plurality of end effector elements has a subdivided spatial resolution that is greater than or equal to the corresponding spatial resolution.

The subdividing may be based upon any suitable criteria. As an example, the subdividing may include subdividing based, at least in part, on a computational load required to perform methods 100. Stated differently, relatively higher subdivided spatial resolutions may require a relatively higher computational load while relatively lower subdivided spatial resolutions may require a relatively lower computational load. With this in mind, the subdividing may include subdividing such that the computational load is within a permissible, or target, computational load range.

As another example, the subdividing may include subdividing based, at least in part, on an accuracy and/or a precision of actuators that move the plurality of end effector elements relative to one another and/or within the command space, such as at the corresponding spatial resolution. With this in mind, the subdividing may include subdividing such that the plurality of corresponding relative orientations is spaced-apart from one another by an amount that is greater than or equal to the accuracy and/or the precision of the actuators, since subdividing to a greater number of relative orientations may not be beneficial.

As yet another example, the subdividing may include subdividing based, at least in part, on a magnitude of vibrations and/or other unexpected and/or random motions within the system, within the multi-component end effector, and/or among the plurality of end effector elements. When the system experiences vibrations and/or other unexpected and/or random motions, it may not be beneficial to subdivide to a resolution that is greater than the magnitude of such motions, as the system may be incapable of controlling motion therewithin to a resolution that is higher than the magnitude of such motions.

As another example, the subdividing may include subdividing based, at least in part, on the kinematic constraints for motion of the system, of the multi-component end effector, and/or of the plurality of end effector elements. When the kinematic constraints dictate that a specific configuration is inaccessible to the plurality of end effector elements, it may not be necessary to consider, or to determine distance heuristics for, such an inaccessible configuration.

As discussed, it may be undesirable, or impermissible, for one or more end effector elements to contact the surface and/or to be less than the minimum distance from the surface. With this in mind, the determining at 120 further may include excluding, from the plurality of distance heuristics, distance heuristics that include corresponding relative orientations in which the distance between the surface and at least one end effector element is less than the minimum distance of the plurality of distance heuristics.

Figure 5:
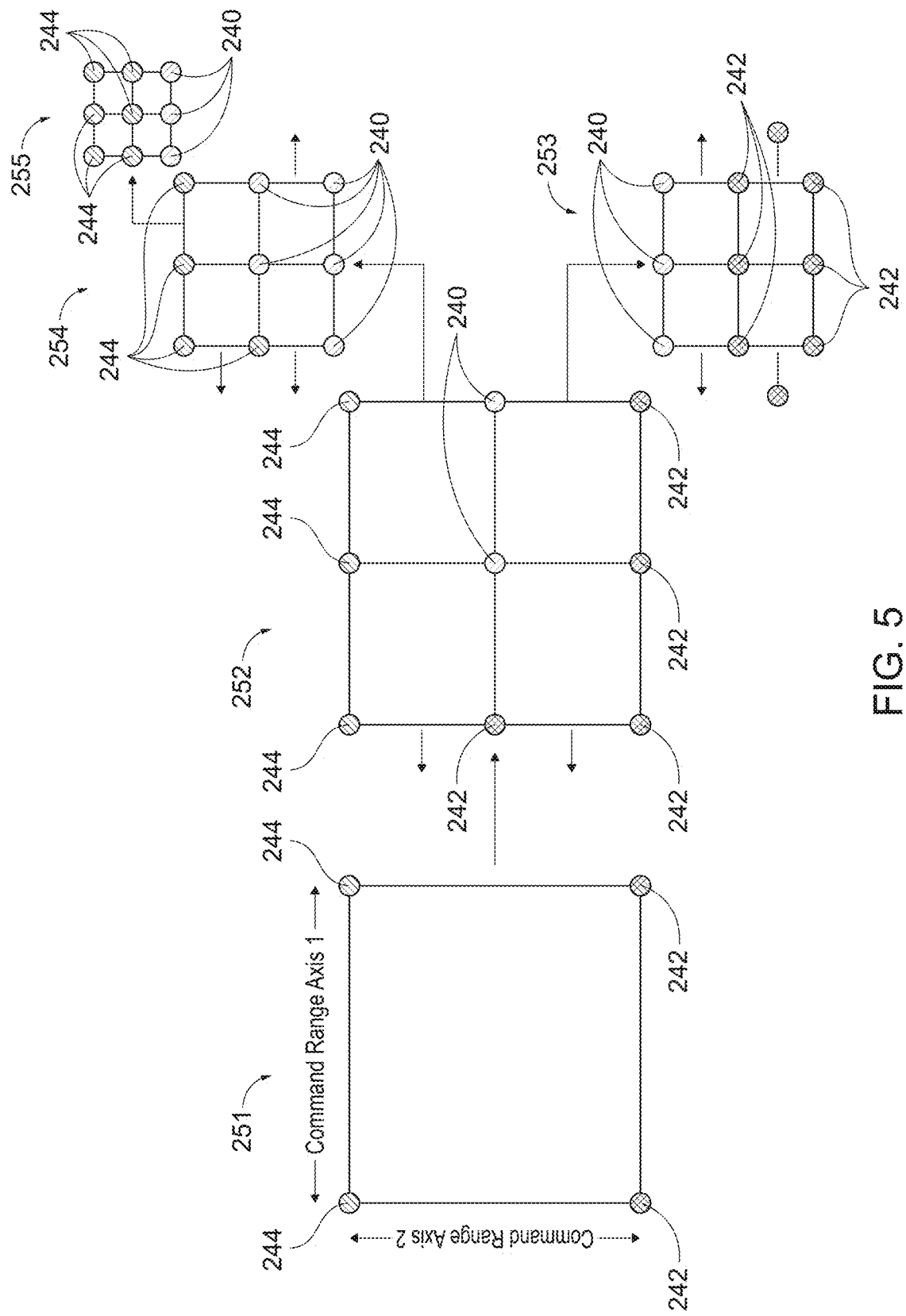
FIG. 5 is a schematic illustration of an example of determination of a plurality of distance heuristics that may be performed during the methods of FIG. 3.

The determining at 120 is illustrated in FIG. 5, which schematically illustrates configurations (illustrated as circles) for the end effector elements of the multi-component end effector within a two-dimensional space that covers two axes of actuation (i.e., Command Range Axis 1 and Command Range Axis 2). In the example of FIG. 5, a first determination may be made at the extremes of motion of Command Range Axis 1 and Command Range Axis 2, as indicated at 251. For this first determination, it is determined that two configurations place the end effector elements at a distance from the surface that is greater than the maximum distance of the plurality of distance heuristics, as indicated at 244, and two configurations place the end effector elements at a distance from the surface that is less than the minimum distance of the plurality of distance heuristics, as indicated at 242. As such, and for first determination 251, no end effector elements are within the target distance range, and the corresponding distance heuristic may be zero or a null set. In addition, and because the configuration of at least one end effector element for first determination 251 is less than the minimum distance from the surface, as indicated at 242, the distance heuristic for first determination 251 is excluded from the plurality of distance heuristics (i.e., first determination 251 represents a configuration that is not permitted).

Subsequently, a second determination may be made, as indicated at 252. Second determination 252 represents a different relative orientation among the plurality of end effector elements when compared to first determination 251, and may consider configurations for the end effector elements that are between the extremes utilized in first determination 251. In the example of FIG. 5, second determination 252 includes three configurations that place the end effector elements at greater than the maximum distance, as indicated at 244, three configurations place the end effector elements at less than the minimum distance, as indicated at 242, and two configurations place the end effector elements within the target distance range. Thus, for second determination 252, the distance heuristics may be greater than zero. However, because the configuration of at least one end effector element for second determination 252 is less than the minimum distance from the surface, as indicated at 242, the distance heuristics for second determination 252 are excluded from the plurality of distance heuristics (i.e., second determination 252 represents a configuration that is not permitted).

Figure 6:
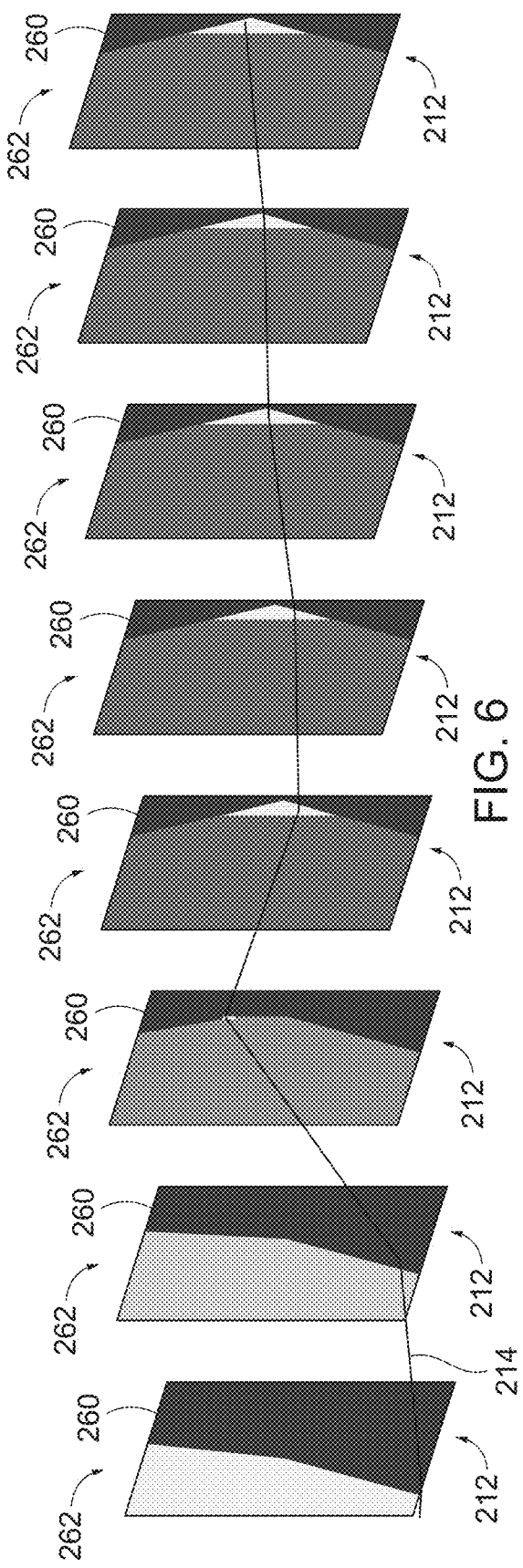
FIG. 6 is an illustration of an example of a plurality of distance heuristics that may be determined during the methods of FIG. 3.

This process may be repeated for all permissible configurations for the multi-component end effector, as indicated at 252, 253, 254, and 255, thereby generating a corresponding distance heuristic for each permissible configuration of the multi-component end effector at a given waypoint. This process also may be repeated at each waypoint, thereby generating the corresponding distance heuristic for each permissible configuration of the multi-component end effector at each waypoint. This is illustrated in FIG. 6, where the plurality of distance heuristics at each waypoint 212 is illustrated by the shaded parallelogram. At each waypoint, distance heuristics that are excluded, due to at least one end effector element being less than the minimum distance from the surface, are indicated at 260; and a remainder of the distance heuristics, which are permissible, are indicated at 262. Within permissible distance heuristics 262, lighter colors represent distance heuristics where a greater fraction of the plurality of end effector elements that is within the target distance range of the surface for the corresponding relative orientation of the plurality of end effector elements.

Updating the distance heuristics at 130 may include updating the plurality of distance heuristics to define a plurality of updated distance heuristics and may be performed subsequent to the determining at 120. The updating at 130 may be performed in any suitable manner. As an example, and as illustrated in FIG. 3, the updating at 130 may include determining a subset of relative orientations at 132, modifying distance heuristics at 134, and sequentially repeating at 136.

Determining the subset of relative orientations at 132 may include determining, for each corresponding relative orientation at a first waypoint, a subset of corresponding relative orientations at an immediately subsequent waypoint that is accessible to the multi-component end effector. The first waypoint may include and/or be the first waypoint along the discretized TCP and/or the first waypoint encountered by the multi-component end effector as the multi-component end effector moves along the continuous TCP. The immediately subsequent waypoint may include and/or be the second waypoint along the discretized TCP and/or the second waypoint encountered by the multi-component end effector as the multi-component end effector moves along the continuous TCP. The subset of corresponding relative orientations may be understood to be "accessible to" the multi-component end effector when, given the kinematic constraints of the system, the multi-component end effector is capable of transitioning from a given relative orientation at the first waypoint to a corresponding relative orientation at the immediately subsequent waypoint.

The subset of corresponding relative orientations may include any suitable number of relative orientations that is accessible to the multi-component end effector. As an example, the subset of corresponding relative orientations may include every relative orientation, at the immediately subsequent waypoint, that is accessible to the multi-component end effector. As another example, the subset of corresponding relative orientations may include a predetermined number of corresponding relative orientations. As yet another example, the subset of corresponding relative orientations may be a predetermined number of corresponding relative orientations, at the immediately subsequent waypoint, that have the highest magnitude distance heuristics and/or that have a distance heuristic that indicates the greatest fraction of the end effector elements is within the target distance range.

Stated differently and in some examples, the determining at 132 may include selecting, for all relative orientations that are accessible to the multi-component end effector at the immediately subsequent waypoint, a number of corresponding relative orientations, or the predetermined number of corresponding relative orientations. Examples of the number of corresponding relative orientations include at least 2, at least 3, at least 4, at least 5, at least 6, at least 8, at most 20, at most 15, at most 10, at most 8, at most 6, and/or at most 4 relative orientations. Additionally or alternatively, and in some examples, the selecting the number of corresponding relative orientations may include selecting such that distance heuristics associated with the number of corresponding relative orientations are greater than distance heuristics associated with all other relative orientations that are accessible to the multi-component end effector at the immediately subsequent waypoint.

Modifying the distance heuristics at 134 may include modifying the plurality of distance heuristics for each corresponding relative orientation at the first waypoint based upon corresponding distance heuristics for the subset of corresponding relative orientations at the immediately subsequent waypoint. This may be accomplished in any suitable manner. As an example, the modifying at 134 may include replacing the distance heuristic for each corresponding relative orientation at the first waypoint with an updated distance heuristic based upon a weighted combination of the sum, average, mean, median, or mode of the corresponding distance heuristics for the subset of corresponding relative orientations at the immediately subsequent waypoint and the original distance heuristic of the corresponding relative orientation at the first waypoint. Stated differently, the modifying at 134 may include replacing the distance heuristic for a given relative orientation at the first waypoint with an updated distance heuristic that is based upon distance heuristics of desirable relative orientations at the immediately subsequent waypoint.

As a specific example, and when the distance heuristics associated with the subset of corresponding relative orientations indicates that the distance between the surface and all end effector elements is greater than the minimum distance, the modifying at 134 may include replacing the distance heuristics for each corresponding relative orientation at the first waypoint with an average of the distance heuristics for the subset of corresponding relative orientations. As another specific example, when the distance heuristics associated with the subset of corresponding relative orientations indicates that the distance between the surface and at least one end effector element of the plurality of end effector elements is less than the minimum distance, the modifying at 134 may include excluding the corresponding relative orientation from the path of the multi-component end effector. Such a configuration may permit exclusion, from the path of the multi-component end effector, of configurations that might result in collisions between the multi-component end effector and the surface.

Sequentially repeating at 136 may include sequentially repeating the determining the subset of corresponding relative orientations and the modifying the plurality of distance heuristics for each waypoint of the plurality of spaced-apart waypoints. This may include sequentially updating the plurality of distance heuristics of the second waypoint, then updating the plurality of distance heuristics of a third waypoint, then updating the plurality of distance heuristics of a fourth waypoint, etc., until the plurality of distance heuristics has been updated at each waypoint of the plurality of waypoints.

Repeating, at 140, the updating at 130 may include repeating the updating at 130 until the selecting at 150 includes selecting the path of the multi-component end effector in which, at each waypoint of the plurality of spaced-apart waypoints, the distance between the surface and all end effector elements of the plurality of end effector elements is greater than the minimum distance. In a specific example, the repeating at 140 may include repeating the updating at 130 a number of times, with the number of times being based at least in part on a height of a largest obstacle on the surface along the continuous TCP, a sampling rate, and a kinematic motion limit of the multi-component end effector. More specifically, the number of times may be greater than or equal to a product of the height of the largest obstacle and the sampling rate divided by the kinematic motion limit of the multi-component end effector. The sampling rate may be defined as the fixed surface speed of the multi-component end effector along the continuous TCP divided by the distance between waypoints. The kinematic motion limit of the multi-component end effector may be defined as the maximum component speed of the end effector elements relative to the surface normal direction of the surface.

Selecting the path at 150 may include selecting the path of the multi-component end effector along the surface and selecting based upon the plurality of updated distance heuristics. As discussed in more detail herein, the path of the multi-component end effector is a complex combination of the continuous TCP, which is regulated by overall motion of the multi-component end effector via the robot, and motion of individual end effector elements of the multi-component end effector relative to one another, relative to the continuous TCP, and/or within the command space of the multi-component end effector.

The selecting at 150 may be performed in any suitable manner. As an example, the selecting at 150 may include selecting for each waypoint a corresponding relative orientation of the plurality of end effector elements that corresponds to a maximum value of a corresponding distance heuristics, or updated distance heuristics, at each waypoint.

The repeating at 140 and the selecting at 150 are illustrated by FIGS. 6-9. As discussed, FIG. 6 illustrates a first update to the plurality of distance heuristics, as performed during the updating at 130. In FIG. 6, a currently preferred individual component trajectory is indicated at 214. Currently preferred individual component trajectory 214 may include a plurality of discrete motions, positions, and/or configurations of individual end effector elements within the multi-component end effector and/or may comprise motions of the individual end effector elements relative to the discretized TCP and/or relative to one another. Stated differently, FIG. 6 may be a graphical representation of the plurality of distance heuristics for a plurality of different relative orientations of the individual end effector elements of the multi-component end effector.

Figure 7:
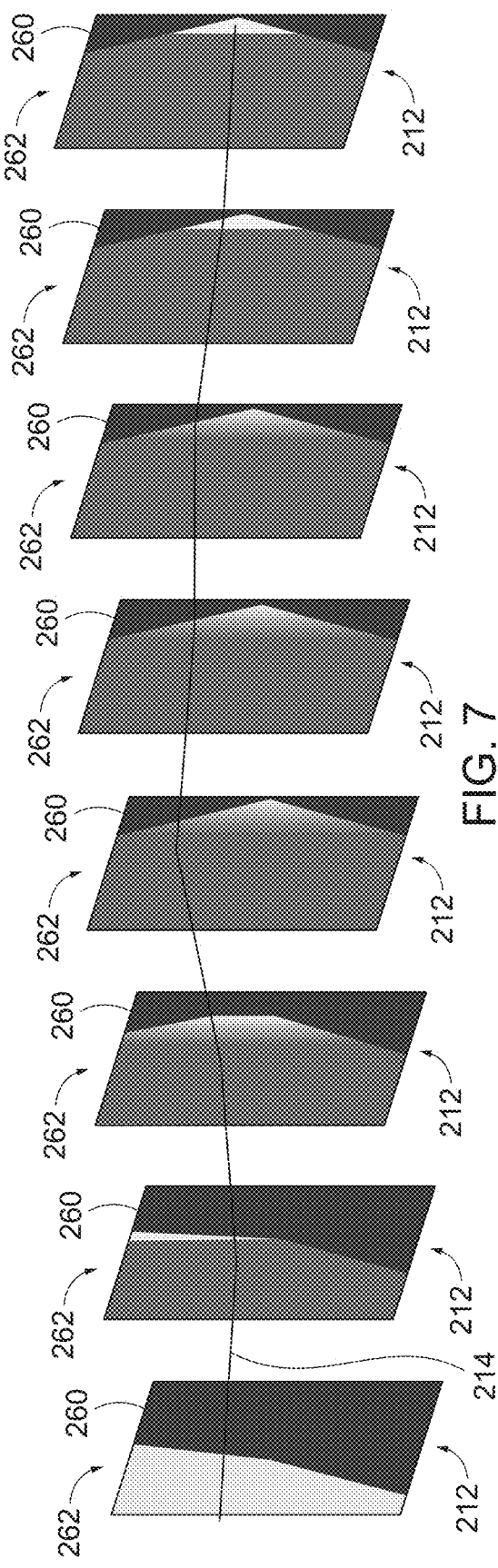
FIG. 7 is an illustration of an example of an update to the plurality of distance heuristics of FIG. 6.
Figure 8:
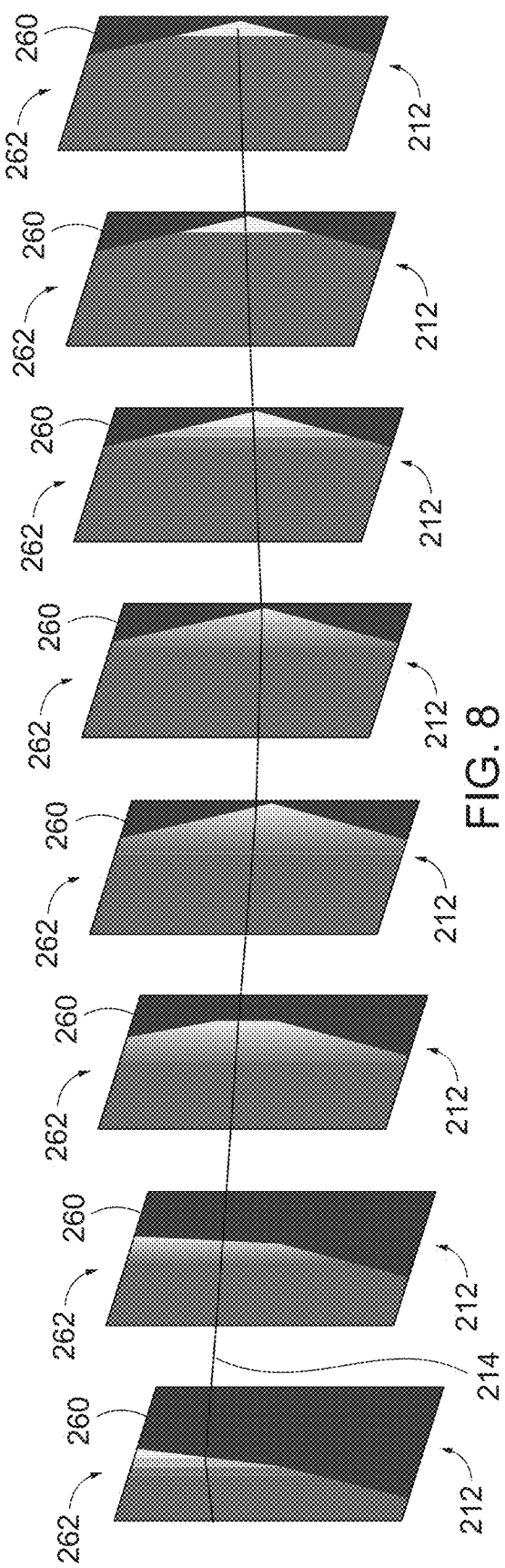
FIG. 8 is an illustration of an example of an update to the plurality of distance heuristics of FIG. 7.
Figure 9:
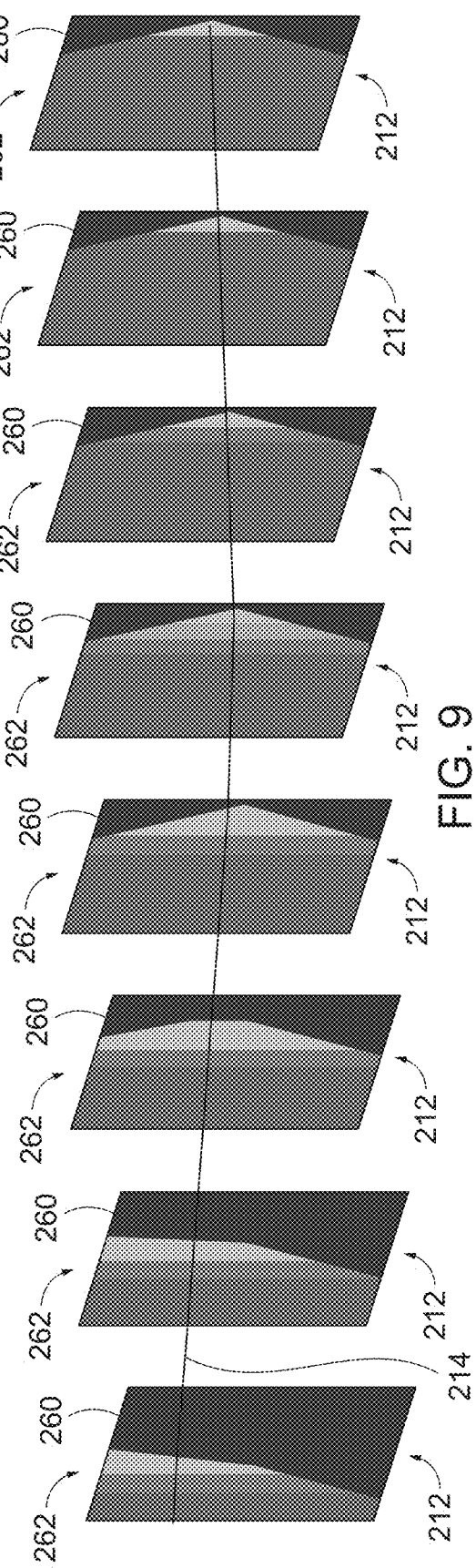
FIG. 9 is an illustration of an example of an update to the plurality of distance heuristics of FIG. 8.

In FIG. 7, and after two additional updates to the plurality of distance heuristics as obtained by performing the updating at 130 two additional times, currently preferred individual component trajectory 214 has shifted to indicate a more optimal overall trajectory. FIGS. 8-9 illustrate further refinements to currently preferred individual component trajectory 214, after a total of 5 and 7 updates, respectively, to the plurality of distance heuristics. As can be seen by a comparison among FIGS. 6-9, currently preferred individual component trajectory 214 converges toward a preferred, or optimal, trajectory after several repetitions of the updating at 130; and this preferred, or optimal, trajectory may be selected during the selecting at 150.

Verifying the distance at 160 may include verifying that the distance between the surface and all end effector elements is greater than the minimum distance. This may include verifying the distance along an entirety of the path of the multi-component end effector and may be performed subsequent to the selecting at 150. Stated differently, the verifying at 160 may include ensuring that there will not be any collisions between the multi-component end effector and the surface when the multi-component end effector is moved relative to the surface and along the path.

The verifying at 160 may be performed in any suitable manner. As an example, the verifying at 160 may include interpolating between each adjacent pair of waypoints, such as to verify that the distance is always greater than a minimum distance between each adjacent pair of waypoints. Responsive to determining that the distance between the surface and at least one end effector element is less than the minimum distance between a given adjacent pair of waypoints, the verifying at 160 further may include modifying the discretized TCP and repeating the updating at 130 and/or the repeating at 140. The modifying the discretized TCP may include inserting a new waypoint between, or equidistant between, the given pair of adjacent waypoints to generated a modified TCP. This modification may increase calculation resolution within this region of the discretized TCP. The repeating the updating at 130 and/or the repeating at 140 may include repeating the updating at 130 and/or the repeating at 140 utilizing the modified TCP. In such a configuration, the verifying at 160 further may include repeating the selecting at 150 to select an updated path subsequent to the repeating the updating at 130 and/or the repeating at 140.

Moving the multi-component end effector at 170 may include moving the multi-component end effector relative to the surface and along the path as selected during the selecting at 150. In some examples, the surface may include and/or be an aerodynamic surface of an aircraft. In some examples, methods 100 further may include performing the operation during the moving at 170. Examples of the performing the operation include printing on the surface, imaging the surface, and/or scanning the surface.

In a specific example, and as discussed in more detail herein, the multi-component end effector may include and/or be a multi-component inkjet print engine. In such an example, the plurality of end effector elements may include and/or be a plurality of individually moveable inkjet print-head arrays, and the multi-component end effector may include a plurality of inkjet print-heads arranged within the plurality of individually moveable inkjet print-head arrays. Also in such an example, the distance heuristics may be based, at least in part, on a number of inkjet print-heads of the plurality of inkjet print-heads that is within the target distance range, and/or the target distance range may include and/or be a print distance specification for the plurality of inkjet print-heads.

In another specific example, and as also discussed in more detail herein, the multi-component end effector may include and/or be a multi-component camera. In such an example, the plurality of end effector elements may include and/or be a plurality of individually moveable cameras. Also in such an example, the distance heuristics may be based, at least in part, on a number of cameras of the plurality of individually moveable cameras that is within the target distance range, and/or the target distance range may include and/or be a focal length specification for the plurality of individually moveable cameras.

In another specific example, and as also discussed in more detail herein, the multi-component end effector may include and/or be a multi-component scanner. In such an example, the plurality of end effector elements may include and/or be a plurality of individually moveable scan elements. Also in such an example, the distance heuristics may be based, at least in part, on a number of scan elements of the plurality of individually moveable scan elements that is within the target distance range, and/or the target distance range may include and/or be a scan distance specification for the plurality of individually moveable scan elements.

Illustrative, non-exclusive examples of inventive subject matter according to the present disclosure are described in the following enumerated paragraphs:

A1. A method for selecting a path of a multi-component end effector along a surface, wherein the multi-component end effector is attached to a robot, which is configured to move the multi-component end effector along the surface on a continuous tool centerpoint path (TCP), optionally at a fixed surface speed, wherein the multi-component end effector includes a plurality of end effector elements configured to move, relative to one another, within a command space of the multi-component end effector, optionally at less than a maximum component speed relative to a surface normal direction of the surface, the method comprising:

providing a discretized TCP, wherein the discretized TCP includes a plurality of spaced-apart waypoints along the continuous TCP;

at each waypoint of the plurality of spaced-apart waypoints, determining a plurality of distance heuristics for the plurality of end effector elements within the command space of the multi-component end effector, wherein each distance heuristic of the plurality of distance heuristics quantifies a fraction of the plurality of end effector elements that is within a target distance range of the surface for a corresponding relative orientation of the plurality of end effector elements, wherein the target distance range is defined between a minimum distance and a maximum distance;

subsequent to the determining the plurality of distance heuristics, updating the plurality of distance heuristics to define a plurality of updated distance heuristics, wherein the updating includes:

(i) for each corresponding relative orientation at a first waypoint of the plurality of spaced-apart waypoints, determining a subset of corresponding relative orientations at an immediately subsequent waypoint of the plurality of spaced-apart waypoints that is accessible to the multi-component end effector;

(ii) modifying the plurality of distance heuristics for each corresponding relative orientation at the first waypoint based upon corresponding distance heuristics for the subset of corresponding relative orientations; and (iii) sequentially repeating the determining the subset of corresponding relative orientations and the modifying the plurality of distance heuristics for each waypoint of the plurality of spaced-apart waypoints; and selecting the path of the multi-component end effector along the surface based upon the plurality of updated distance heuristics.

A2. The method of paragraph A1, wherein the determining the plurality of distance heuristics includes subdividing the command space of the multi-component end effector into a plurality of corresponding relative orientations of the plurality of end effector elements.

A3. The method of any of paragraphs A1-A2, wherein the determining the plurality of distance heuristics includes excluding, from the plurality of distance heuristics, distance heuristics that include corresponding relative orientations in which a distance between the surface and at least one end effector element of the plurality of end effector elements is less than the minimum distance.

A4. The method of any of paragraphs A1-A3, wherein the determining the subset of corresponding relative orientations includes selecting, from all relative orientations that are accessible to the multi-component end effector at the immediately subsequent waypoint, a number of corresponding relative orientations.

A5. The method of paragraph A4, wherein the number of corresponding relative orientations includes at least one of:
(i) at least 2, at least 3, at least 4, at least 5, at least 6, or at least 8 relative orientations; and
(ii) at most 20, at most 15, at most 10, at most 8, at most 6, or at most 4 relative orientations.

A6. The method of any of paragraphs A4-A5, wherein the selecting the number of corresponding relative orientations includes selecting such that distance heuristics associated with the number of corresponding relative orientations are greater than distance heuristics associated with all other relative orientations that are accessible to the multi-component end effector at the immediately subsequent waypoint.

A7. The method of any of paragraphs A1-A6, wherein the modifying the plurality of distance heuristics for each corresponding relative orientation at the first waypoint includes one of:
(i) when the distance heuristics associated with the subset of corresponding relative orientations indicates that a distance between the surface and all end effector elements of the plurality of end effector elements is greater than the minimum distance, replacing the distance heuristics for each corresponding relative orientation at the first waypoint with an average of the distance heuristics for the subset of corresponding relative orientations; and
(ii) when the distance heuristics associated with the subset of corresponding relative orientations indicates that a/the distance between the surface and at least one end effector element of the plurality of end effector elements is less than the minimum distance of the plurality of distance heuristics, excluding the corresponding relative orientation from the path of the multi-component end effector.

A8. The method of any of paragraphs A1-A7, wherein the method further includes repeating the updating until the selecting the path of the multi-component end effector includes selecting a path in which, at each waypoint of the plurality of spaced-apart waypoints, a/the distance between the surface and all end effector elements of the plurality of end effector elements is greater than the minimum distance of the plurality of distance heuristics.

A9. The method of any of paragraphs A1-A8, wherein, subsequent to the selecting the path of the multi-component end effector, the method further includes verifying that a/the distance between the surface and all end effector elements of the plurality of end effector elements is greater than the minimum distance along an entirety of the path of the multi-component end effector.

A10. The method of paragraph A9, wherein the verifying includes interpolating between each adjacent pair of waypoints of the plurality of spaced-apart waypoints.

A11. The method of any of paragraphs A9-A10, wherein, responsive to determining that a/the distance between the surface and at least one end effector element of the plurality of end effector elements is less than a minimum distance between a given adjacent pair of waypoints, the verifying further includes:
(i) modifying the discretized TCP to generate a modified TCP by inserting a new waypoint between the given adjacent pair of waypoints; and
(ii) repeating the updating the plurality of distance heuristics utilizing the modified TCP.

A12. The method of any of paragraphs A1-A11, wherein a distance between each waypoint of the plurality of spaced-apart waypoints and an adjacent waypoint of the plurality of spaced-apart waypoints is based, at least in part, on a maximum height of the surface along the continuous TCP, a minimum height of the surface along the continuous TCP, the maximum component speed of the plurality of end effector elements, and the fixed surface speed.

A13. The method of any of paragraphs A1-A12, wherein the providing the discretized TCP includes generating the continuous TCP.

A14. The method of paragraph A13, wherein the generating the continuous TCP includes providing a representation of the surface.

A15. The method of paragraph A14, wherein the providing the representation of the surface includes at least one of:
(i) providing a model of the surface; and
(ii) 3-D scanning the surface.

A16. The method of any of paragraphs A14-A15, wherein the generating the continuous TCP further includes selecting an initial trajectory for the multi-component end effector along the representation of the surface and modifying the initial trajectory to generate the continuous TCP.

A17. The method of paragraph A16, wherein the modifying the initial trajectory includes curve-fitting the initial trajectory to the representation of the surface.

A18. The method of any of paragraphs A16-A17, wherein the modifying the initial trajectory includes modifying such that a work envelope of the multi-component end effector overlaps with the representation of the surface along the continuous TCP.

A19. The method of any of paragraphs A13-A18, wherein the providing the discretized TCP further includes determining a/the distance between adjacent waypoints of the plurality of spaced-apart waypoints.

A20. The method of paragraph A19, wherein the determining the distance between adjacent waypoints includes determining, along the continuous TCP, a maximum distance between the continuous TCP and the surface, a minimum distance between the continuous TCP and the surface, and a distance difference between the maximum distance and the minimum distance.

A21. The method of paragraph A20, wherein the determining the distance between adjacent waypoints includes calculating the distance between adjacent waypoints based, at least in part, on a/the fixed surface speed of the multi-component end effector along the surface, a/the maximum component speed relative to a/the surface normal of the surface, and the distance difference.

A22. The method of any of paragraphs A19-A21, wherein the providing the discretized TCP includes discretizing the continuous TCP into the plurality of spaced-apart waypoints spaced-apart by the distance between adjacent waypoints.

A23. The method of paragraph A22, wherein the providing the discretized TCP further includes interpolating between adjacent waypoints of the plurality of spaced-apart waypoints to define the discretized TCP.

A24. The method of any of paragraphs A1-A23, wherein the selecting the path of the multi-component end effector includes selecting, for each waypoint of the plurality of spaced-apart waypoints, a corresponding relative orientation of the plurality of end effector elements that corresponds to a maximum value of a corresponding distance heuristic at each waypoint.

A25. The method of any of paragraphs A1-A24, wherein the multi-component end effector includes a multi-component inkjet print engine, wherein the plurality of end effector elements includes a plurality of individually moveable inkjet print-head arrays, and further wherein the multi-component end effector includes a plurality of inkjet print-heads arranged within the plurality of individually moveable inkjet print-head arrays.

A26. The method of paragraph A25, wherein the plurality of distance heuristics is based, at least in part, on a number of inkjet print-heads of the plurality of inkjet print-heads that is within the target distance range.

A27. The method of any of paragraphs A25-A26, wherein the target distance range is a print distance specification for the plurality of inkjet print-heads.

A28. The method of any of paragraphs A1-A27, wherein the multi-component end effector includes a multi-component camera, wherein the plurality of end effector elements includes a plurality of individually moveable cameras.

A29. The method of paragraph A28, wherein the plurality of distance heuristics is based, at least in part, on a number of cameras of the plurality of individually moveable cameras that is within the target distance range.

A30. The method of any of paragraphs A28-A29, wherein the target distance range is a focal distance specification for the plurality of individually moveable cameras.

A31. The method of any of paragraphs A1-A30, wherein the multi-component end effector includes a multi-component scanner, wherein the plurality of end effector elements includes a plurality of individually moveable scan elements.

A32. The method of paragraph A31, wherein the plurality of distance heuristics is based, at least in part, on a number of scan elements of the plurality of individually moveable scan elements that is within the target distance range.

A33. The method of any of paragraphs A31-A32, wherein the target distance range is a scan distance specification for the plurality of individually moveable scan elements.

A34. The method of any of paragraphs A1-A33, wherein the minimum distance of the plurality of distance heuristics is 0.5 millimeters (mm), 1 mm, 1.5 mm, 2 mm, 2.5 mm, 3 mm, 4 mm, 6 mm, 8 mm, or 10 mm.

A35. The method of any of paragraphs A1-A34, wherein the maximum distance of the plurality of distance heuristics is 50 mm, 40 mm, 30 mm, 25 mm, 20 mm, 18 mm, 16 mm, 14 mm, 12 mm, 10 mm, 9 mm, 8 mm, 7 mm 6 mm, or 5 mm.

A36. The method of any of paragraphs A1-A35, wherein the fixed surface speed of the multi-component end effector along the continuous TCP is at least one of:
(i) at least 0.05 meters/second (m/s), at least 0.1 m/s, at least 0.15 m/s, at least 0.2 m/s, at least 0.25 m/s, at least 0.3 m/s, at least 0.4 m/s, or at least 0.5 m/s; and
(ii) at most 1 m/s, at most 0.9 m/s, at most 0.8 m/s, at most 0.7 m/s, at most 0.6 m/s, at most 0.5 m/s, at most 0.4 m/s, at most 0.35 m/s, at most 0.3 m/s, at most 0.25 m/s, at most 0.2 m/s, or at most 0.15 m/s.

A37. The method of any of paragraphs A1-A36, wherein the maximum component speed is at least one of:
(i) at least 0.2 m/s, at least 0.3 m/s, at least 0.4 m/s, at least 0.5 m/s, at least 0.6 m/s, at least 0.7 m/s, at least 0.8 m/s, at least 0.9 m/s, or at least 1 m/s; and
(ii) at most 2 m/s, at most 1.9 m/s, at most 1.8 m/s, at most 1.7 m/s, at most 1.6 m/s, at most 1.5 m/s, at most 1.4 m/s, at most 1.3 m/s, at most 1.2 m/s, at most 1.1 m/s, or at most 1.0 m/s.

A38. The method of any of paragraphs A1-A37, wherein the multi-component end effector has an end effector length of at least one of:
(i) at least 1.25 meters (m), at least 1.5 m, at least 2 m, at least 2.5 m, or at least 3 m; and
(ii) at most 4 m, at most 3.5 m, at most 3 m, at most 2.5 m, or at most 2 m.

A39. The method of any of paragraphs A1-A38, wherein the multi-component end effector has an end effector width of at least one of:
(i) at least 1.25 m, at least 1.5 m, at least 2 m, at least 2.5 m, or at least 3 m; and
(ii) at most 4 m, at most 3.5 m, at most 3 m, at most 2.5 m, or at most 2 m.

A40. The method of any of paragraphs A1-A39, wherein the command space of the multi-component end effector defines a maximum range-of-motion perpendicular to the continuous TCP, wherein the maximum range-of-motion is at least one of:
(i) at least 0.1 m, at least 0.15 m, at least 0.2 m, at least 0.25 m, at least 0.3 m, at least 0.35 m, or at least 0.4 m; and
(ii) at most 1 m, at most 0.9 m, at most 0.8 m, at most 0.7 m, at most 0.6 m, at most 0.5 m, at most 0.4 m, or at most 0.3 m.

A41. The method of any of paragraphs A1-A40, wherein the method further includes moving the multi-component end effector relative to the surface and along the path.

A42. The method of paragraph A41, wherein the surface includes an aerodynamic surface of an aircraft.

A43. The method of any of paragraphs A41-A42, wherein the method further includes performing an operation during the moving the multi-component end effector.

A44. The method of paragraph A43, wherein the performing the operation includes at least one of:
(i) printing on the surface;
(ii) imaging the surface; and
(iii) scanning the surface.

B1. A system for performing an operation near a surface, the system comprising:

a multi-component end effector that includes a plurality of end effector elements configured to move relative to one another within a command space of the multi-component end effector;

a robot, wherein the multi-component end effector is operatively attached to the robot, and further wherein the robot is configured to move the multi-component end effector along the surface; and a controller programmed to control the operation of the system according to the method of any of paragraphs A1-A44.

C1. Non-transitory computer-readable storage media including computer-readable instructions that, when executed, direct a robot to control a multi-component end effector according to the method of any of paragraphs A1-A44.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

The invention claimed is:

1. A method for selecting a path of a multi-component end effector along a surface, wherein the multi-component end effector is attached to a robot, which is configured to move the multi-component end effector along the surface on a continuous tool centerpoint path (TCP), wherein the multi-component end effector includes a plurality of end effector elements configured to move relative to one another within a command space of the multi-component end effector; the method comprising:

providing a discretized TCP, wherein the discretized TCP includes a plurality of spaced-apart waypoints along the continuous TCP;

at each waypoint of the plurality of spaced-apart waypoints, determining a plurality of distance heuristics for the plurality of end effector elements within the command space of the multi-component end effector, wherein each distance heuristic of the plurality of distance heuristics quantifies a fraction of the plurality of end effector elements that is within a target distance range of the surface for a corresponding relative orientation of the plurality of end effector elements, wherein the target distance range is defined between a minimum distance and a maximum distance;

subsequent to the determining the plurality of distance heuristics, updating the plurality of distance heuristics to define a plurality of updated distance heuristics, wherein the updating includes:

(i) for each corresponding relative orientation at a first waypoint of the plurality of spaced-apart waypoints, determining a subset of corresponding relative orientations at an immediately subsequent waypoint of the plurality of spaced-apart waypoints that is accessible to the multi-component end effector;

(ii) modifying the plurality of distance heuristics for each corresponding relative orientation at the first waypoint based upon corresponding distance heuristics for the subset of corresponding relative orientations; and (iii) sequentially repeating the determining the subset of corresponding relative orientations and the modifying the plurality of distance heuristics for each waypoint of the plurality of spaced-apart waypoints; and selecting the path of the multi-component end effector along the surface based upon the plurality of updated distance heuristics.

2. The method of claim 1, wherein the determining the plurality of distance heuristics includes subdividing the command space of the multi-component end effector into a plurality of corresponding relative orientations of the plurality of end effector elements.

3. The method of claim 1, wherein the determining the plurality of distance heuristics includes excluding, from the plurality of distance heuristics, distance heuristics that include corresponding relative orientations in which a distance between the surface and at least one end effector element of the plurality of end effector elements is less than the minimum distance of the plurality of distance heuristics.

4. The method of claim 1, wherein the determining the subset of corresponding relative orientations includes selecting, from all relative orientations that are accessible to the multi-component end effector at the immediately subsequent waypoint, a number of corresponding relative orientations.

5. The method of claim 4, wherein the selecting the number of corresponding relative orientations includes selecting such that distance heuristics associated with the number of corresponding relative orientations are greater than distance heuristics associated with all other relative orientations that are accessible to the multi-component end effector at the immediately subsequent waypoint.

6. The method of claim 1, wherein the modifying the plurality of distance heuristics for each corresponding relative orientation at the first waypoint includes one of:

(i) when the distance heuristics associated with the subset of corresponding relative orientations indicates that a distance between the surface and all end effector elements of the plurality of end effector elements is greater than the minimum distance plurality of distance heuristics, replacing the distance heuristics for each corresponding relative orientation at the first waypoint with an average of the distance heuristics for the subset of corresponding relative orientations; and (ii) when the distance heuristics associated with the subset of corresponding relative orientations indicates that a distance between the surface and at least one end effector element of the plurality of end effector elements is less than the minimum distance plurality of distance heuristics, excluding the corresponding relative orientation from the path of the multi-component end effector.

7. The method of claim 1, wherein the method further includes repeating the updating until the selecting the path of the multi-component end effector includes selecting a path in which, at each waypoint of the plurality of spaced-apart waypoints, a distance between the surface and all end effector elements of the plurality of end effector elements is greater than the minimum distance plurality of distance heuristics.

8. The method of claim 1, wherein, subsequent to the selecting the path of the multi-component end effector, the method further includes verifying that a distance between the surface and all end effector elements of the plurality of end effector elements is greater than the minimum distance along an entirety of the path of the multi-component end effector.

9. The method of claim 8, wherein, responsive to determining that the distance between the surface and at least one end effector element of the plurality of end effector elements is less than a minimum distance between a given adjacent pair of waypoints, the verifying further includes:

(i) modifying the discretized TCP to generate a modified TCP by inserting a new waypoint between the given adjacent pair of waypoints; and (ii) repeating the updating the plurality of distance heuristics utilizing the modified TCP.

10. The method of claim 1, wherein a distance between each waypoint of the plurality of spaced-apart waypoints and an adjacent waypoint of the plurality of spaced-apart waypoints is based, at least in part, on a maximum height of the surface along the continuous TCP, a minimum height of the surface along the continuous TCP, a maximum component speed of the plurality of end effector elements relative to a surface normal direction of the surface, and a fixed surface speed of the multi-component end effector along the surface on the continuous TCP.

11. The method of claim 1, wherein the providing the discretized TCP includes generating the continuous TCP.

12. The method of claim 1, wherein the providing the discretized TCP further includes determining a distance between adjacent waypoints of the plurality of spaced-apart waypoints.

13. The method of claim 12, wherein the providing the discretized TCP includes discretizing the continuous TCP into the plurality of spaced-apart waypoints spaced-apart by the distance between adjacent waypoints.

14. The method of claim 1, wherein the selecting the path of the multi-component end effector includes selecting, for each waypoint of the plurality of spaced-apart waypoints, a corresponding relative orientation of the plurality of end effector elements that corresponds to a maximum value of a corresponding distance heuristic at each waypoint.

15. The method of claim 1, wherein the multi-component end effector includes a multi-component inkjet print engine, wherein the plurality of end effector elements includes a plurality of individually moveable inkjet print-head arrays, and further wherein the multi-component end effector includes a plurality of inkjet print-heads arranged within the plurality of individually moveable inkjet print-head arrays.

16. The method of claim 15, wherein the distance heuristic is based, at least in part, on a number of inkjet print-heads of the plurality of inkjet print-heads that is within the target distance range.

17. The method of claim 15, wherein the target distance range is a print distance specification for the plurality of inkjet print-heads.

18. The method of claim 1, wherein the method further includes moving the multi-component end effector relative to the surface and along the path.

19. A system for performing an operation near a surface, the system comprising:
- a multi-component end effector that includes a plurality of end effector elements configured to move, relative to one another, within a command space of the multi-component end effector;
- a robot, wherein the multi-component end effector is operatively attached to the robot, and further wherein the robot is configured to move the multi-component end effector along the surface; and
- a controller programmed to control the operation of the system according to the method of claim 1.

20. Non-transitory computer-readable storage media including computer-readable instructions that, when executed, direct a robot to control a multi-component end effector according to the method of claim 1.

\* \* \* \* \*